(12) United States Patent
Nielsen et al.

(10) Patent No.: US 11,922,685 B2
(45) Date of Patent: *Mar. 5, 2024

(54) PRESENTATION OF INFORMATION FROM THE SKY

(71) Applicant: Snap Inc., Santa Monica, CA (US)

(72) Inventors: Simon Saito Haagen Nielsen, Beverly Hills, CA (US); Zachary Collins Conatser, Santa Monica, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/896,664

(22) Filed: Aug. 26, 2022

(65) Prior Publication Data

US 2022/0415041 A1 Dec. 29, 2022

Related U.S. Application Data

(63) Continuation of application No. 16/285,296, filed on Feb. 26, 2019, now Pat. No. 11,481,997.

(Continued)

(51) Int. Cl.
*B64D 47/06* (2006.01)
*B64C 39/02* (2023.01)
(Continued)

(52) U.S. Cl.
CPC .......... *G06V 20/10* (2022.01); *B64C 39/024* (2013.01); *B64D 47/02* (2013.01); *B64D 47/08* (2013.01);

(Continued)

(58) Field of Classification Search
CPC ...... G05D 1/00; G05D 1/0011; G05D 1/0094; G05D 1/101; G06K 9/34; G06K 9/00664; G09F 19/18; G09F 21/16; B64D 47/06; B64D 45/08; B64D 47/08; G06T 5/005; G02B 1/06; B23K 26/355; G03B 21/608;
(Continued)

(56) References Cited

U.S. PATENT DOCUMENTS 2,345,152 A * 3/1944 Remey .................... G09F 21/16
40/213
3,238,526 A * 3/1966 Bissett ...................... G01S 7/02
342/13

(Continued)

FOREIGN PATENT DOCUMENTS

AU 2004207369 B8 * 2/2008 .......... G01C 11/025
CN 106165000 A * 11/2016 ............. B60K 35/00
(Continued)

*Primary Examiner* — Yuri Kan
(74) *Attorney, Agent, or Firm* — Culhane Meadows PLLC; Stephen J. Weed

(57) ABSTRACT

Systems, devices, and methods for presenting information in the sky using drones are disclosed. The presentation of information includes navigating one or more drones to locations in the sky where the locations are associated with an image, emitting light signals at the locations, capturing the light signals with a user device, processing the captured signals to identify the image, capturing a background image including at least one of the locations associated with the image, and presenting simultaneously, on the user device, the identified image and the background image.

20 Claims, 13 Drawing Sheets

Related U.S. Application Data

(60) Provisional application No. 62/640,925, filed on Mar. 9, 2018.

(51) Int. Cl.

| | | |
|---|---|---|
| *B64D 45/08* | (2006.01) | |
| *B64D 47/02* | (2006.01) | |
| *B64D 47/08* | (2006.01) | |
| *B64U 101/00* | (2023.01) | |
| *G02B 1/06* | (2006.01) | |
| *G03B 21/608* | (2014.01) | |
| *G05D 1/00* | (2006.01) | |
| *G05D 1/10* | (2006.01) | |
| *G06F 18/22* | (2023.01) | |
| *G06V 20/10* | (2022.01) | |
| *G09F 21/16* | (2006.01) | |
| *H04N 13/178* | (2018.01) | |

(52) U.S. Cl.
CPC .............. *G05D 1/101* (2013.01); *G06F 18/22* (2023.01); *B64U 2101/00* (2023.01); *B64U 2201/102* (2023.01); *B64U 2201/104* (2023.01)

(58) Field of Classification Search
CPC ............ H04N 5/23218; H04N 13/178; H04N 23/682; B60Q 9/004; B60R 1/04; G06V 20/58
See application file for complete search history.

(56) References Cited

U.S. PATENT DOCUMENTS

| | | | | |
|---|---|---|---|---|
| 5,992,065 | A * | 11/1999 | Preiser ................... | G09F 21/16 40/212 |
| 8,576,056 | B2 * | 11/2013 | Clair ..................... | A01D 75/187 340/436 |
| 10,068,506 | B2 * | 9/2018 | Garcia Morchon . | G05D 1/0094 |
| 11,481,997 | B1 * | 10/2022 | Nielsen ................. | G05D 1/101 |
| 2006/0071929 | A1 * | 4/2006 | Stinis ..................... | G09F 21/16 345/213 |
| 2009/0190001 | A1 * | 7/2009 | Cheimets ............... | H04N 23/70 348/231.99 |
| 2010/0081416 | A1 * | 4/2010 | Cohen ..................... | H04L 67/38 455/414.1 |
| 2010/0165081 | A1 * | 7/2010 | Jung ..................... | H04N 13/178 348/46 |
| 2015/0317924 | A1 * | 11/2015 | Park ...................... | G05D 1/0088 40/213 |
| 2016/0155009 | A1 * | 6/2016 | Han .................... | H04N 5/23218 382/173 |
| 2016/0267825 | A1 * | 9/2016 | Stewart .................. | G09F 21/16 |
| 2017/0050747 | A1 * | 2/2017 | Wessler ................. | B64D 45/08 |
| 2017/0221394 | A1 * | 8/2017 | Garcia Morchon . | G03B 21/608 |
| 2017/0264833 | A1 * | 9/2017 | Barnes ................. | G03B 15/05 |
| 2019/0146501 | A1 * | 5/2019 | Schick ................ | G05D 1/0094 701/3 |
| 2019/0353975 | A1 * | 11/2019 | Didomenico ............ | G02B 1/06 |
| 2019/0358744 | A1 * | 11/2019 | Hildebrand .......... | B23K 26/355 |

FOREIGN PATENT DOCUMENTS

| | | | | |
|---|---|---|---|---|
| CN | 106985751 | A * | 7/2017 | ............... B60R 1/00 |
| JP | 2004114976 | A * | 4/2004 | ............. B60Q 9/004 |

* cited by examiner

PRESENTATION OF INFORMATION FROM THE SKY

CROSS-REFERENCE TO RELATED APPLICATIONS

This application is a Continuation of U.S. application Ser. No. 16/285,296 filed on Feb. 26, 2019, and claims priority to U.S. Provisional application Ser. No. 62/640,925 filed on Mar. 9, 2018, the contents of both of which are incorporated fully herein by reference.

TECHNICAL FIELD

The present subject matter relates to presenting information from the sky and, more specifically, to presenting information associated with images from the sky (e.g., as flashes of light) using flying devices (e.g., drones) and using user devices to capture and process the information to present the images.

BACKGROUND

Traditionally, an airplane presents simple images such as text and symbols in the sky (i.e., "skywriting") by deploying smoke as it flies through the sky. The images are typically very simple and require a large amount of airspace due to the limited maneuverability of airplanes. Additionally, the images may blur/dissipate quickly in strong winds and the airplane expends a large amount of fuel to create the simple images.

Recently, companies are using coordinated drones to present text and images. In one instance, a large number of drones (e.g., 500 to 1000 drones) fly simultaneously with each drone projecting light to create patterns in the air (e.g., the Intel® logo). Due to the large number of drones, such systems are very expensive and require complex coordination software.

BRIEF DESCRIPTION OF THE DRAWINGS

The drawing figures depict one or more examples, by way of example only, not by way of limitations. In the figures, like reference numerals refer to the same or similar elements.

DETAILED DESCRIPTION

In the following description, numerous specific details are set forth by way of examples in order to provide a thorough understanding of the relevant teachings. How to practice the present teachings, however, should be apparent to those skilled in the art without the need for such details. In other instances, well-known methods, procedures, components, and circuitry are described at a relatively high-level, without detail, in order to avoid unnecessarily obscuring aspects of the present teachings.

In an example, a system includes a drone having a navigation unit to navigate the drone to locations associated with an image. The drone also includes an emitter to emit light signals at the locations. The system also includes a non-transitory computer readable medium storing a program. Execution of the program configures a user device to capture, with an imager of the user device, the light signals emitted by the emitter of the drone. Execution of the program of the non-transitory computer readable medium also configures the user device to process the captured signals to identify the image and capture, with the imager, a background image including at least one of the locations associated with the image. Execution of the program of the non-transitory computer readable medium further configures the user device to present simultaneously, on a display of the user device, at least a portion of the identified image (e.g., the portion corresponding to the locations in the background image) and the background image.

Figure 1:
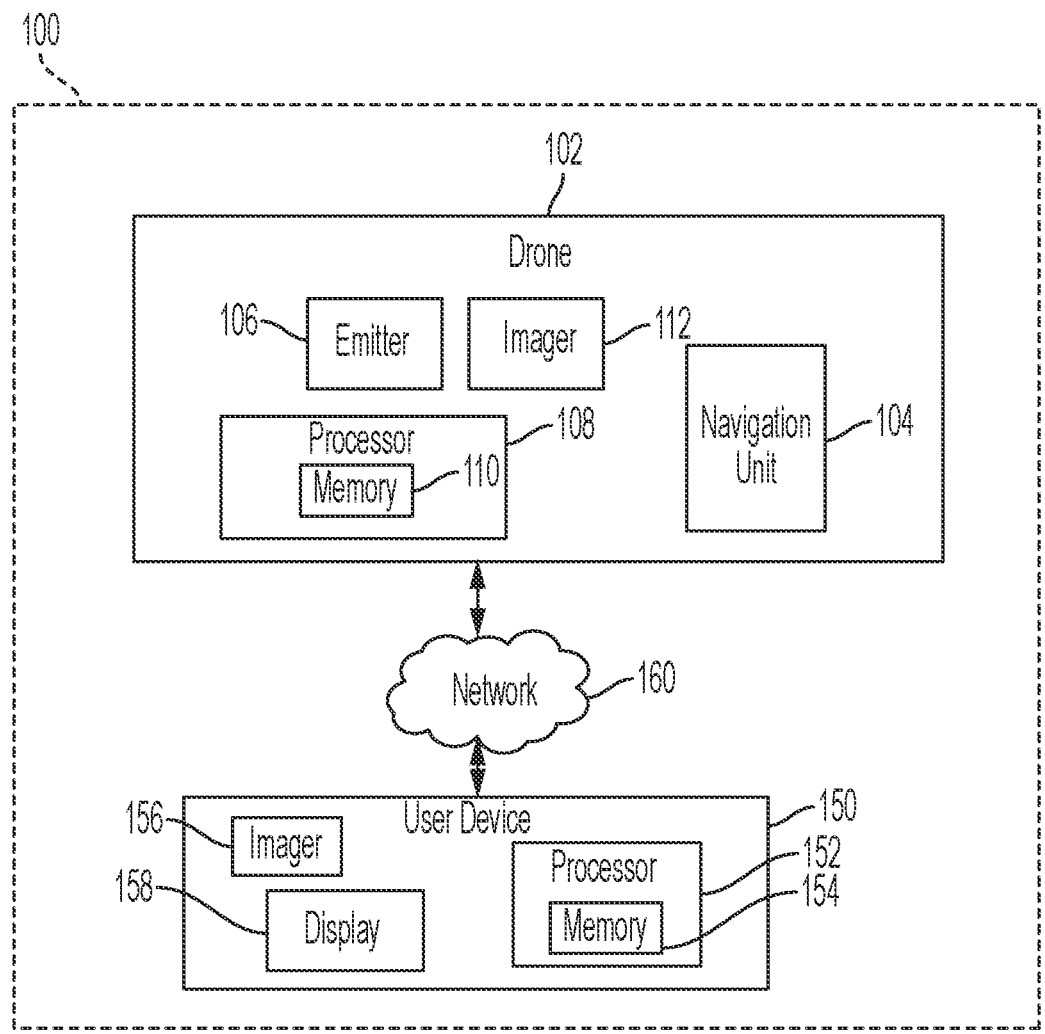
FIG. 1 is a block diagram of an example system for presenting an image utilizing a single drone.

FIG. 1 is block diagram of an example system 100 including a drone 102 and a user device 150. The drone 102 and the user device 150 communicate with a network 160 such as an Internet.

The illustrated drone 102 has a navigation unit 104, an emitter 106, and a processor 108. The navigation unit 104 determines a location of the drone 102 in space. The navigation unit 104 also determines the direction of the drone in space. The navigation unit 104 may be a global positioning system (GPS) such as a real time kinematic (RTK) GPS. The processor 108 includes a memory 110. In the example illustrated in FIG. 1, the drone 102 supports the processor 108 and memory 110. Alternatively, the processor 108 and/or memory 110 may be separate components in the system 100. One of skill in the art will understand suitable drones, navigation units, emitters, memory, and processors from the description herein.

In one example, the memory 110 stores one or more images. Some examples of the images include but are not limited to a character, a number, a letter of alphabet, a symbol etc. The memory 110 also stores locations associated with the one or more images. The memory 110 may also store instructions for execution by the processor 108 to utilize the navigation unit 104 and the emitter 106 of the drone 102 to perform various functions described herein.

Figure 3A:
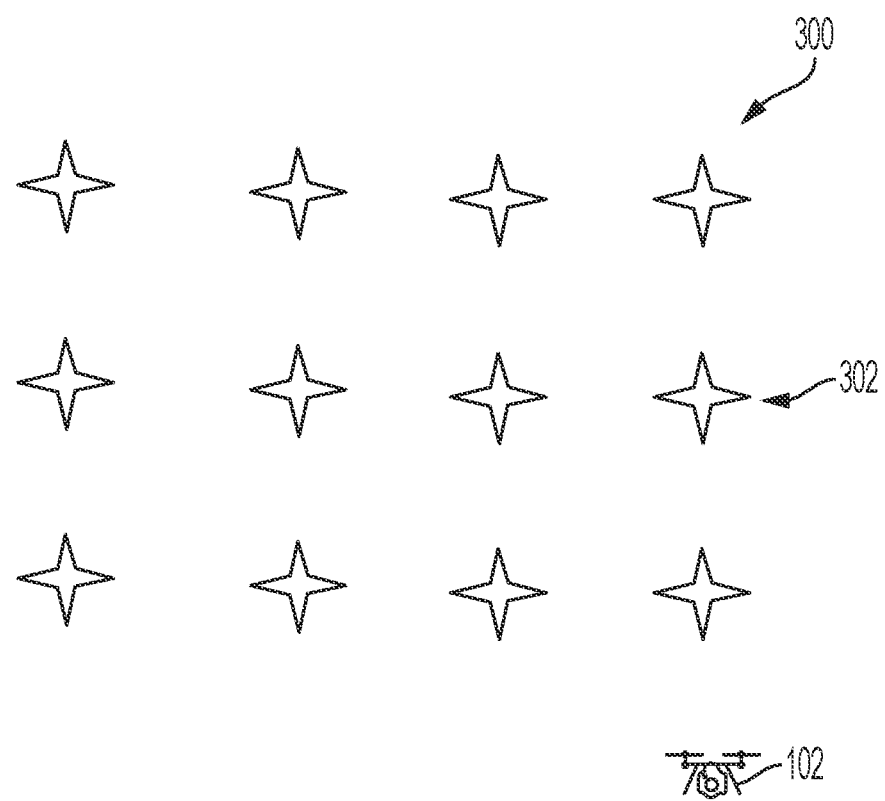
FIG. 3A is an example of light signals emitted in space by the single drone of FIG. 1.
Figure 3B:
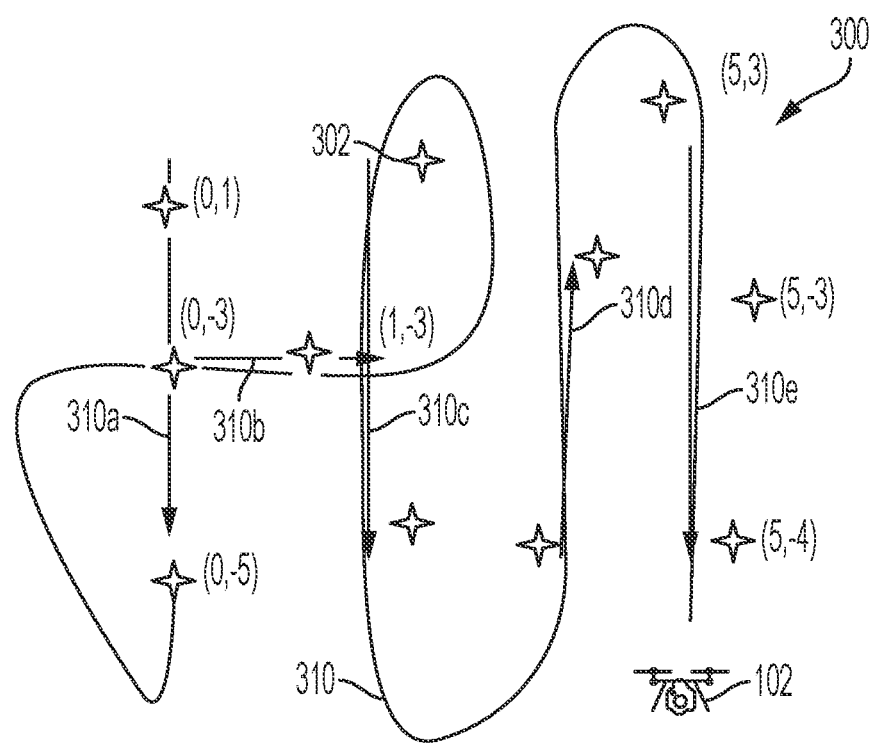
FIG. 3B is an example of a path of the single drone and the emitted light signals of FIG. 3A.

In one example, the processor 108 utilizes the navigation unit 104 to navigate the drone 102 to locations associated with an image. The locations may be pre-defined locations 302 (FIG. 3A) associated with a predetermined path 310 in space (FIG. 3B). The processor 108 utilizes the emitter 106 to emit light signals at the locations 302 (FIG. 3A). The light signals may include flashes and/or colors of light. In one example, the emitter 106 emits a first light pattern (e.g., a single flash for a specified period of time) to indicate the start of a line segment and a second light pattern (e.g., a double flash for specified periods of time) to indicate the end of a line segment. In another example, a green light may indicate the start of a line segment and a red light may indicate the end of a line segment.

The network 160 may include a wireless communication network such as a radio frequency communication, light communication, satellite communications etc. In one example, the user device 150 is a mobile user device such as a smartphone, smart eyewear, a laptop, a personal computer (PC), a desktop, or other smart device capable of capturing and processing light signals (e.g., alone or with assistance of a remote computing device) to identify an image and of presenting the image.

The illustrated user device 150 includes a processor 152, an imager 156, and a display 158. The processor 152 includes a memory 154 that may store instructions for execution by the processor 152 to perform one or more of the functions utilizing the imager 156 and the display 158 as described herein. Some of the functions include capturing with the imager 156 a background image and the signals emitted by the emitter 106 of the drone 102. Other functions include processing the captured signals to identify an image and presenting simultaneously, on the display 158, the identified image and the background image.

Figure 2:
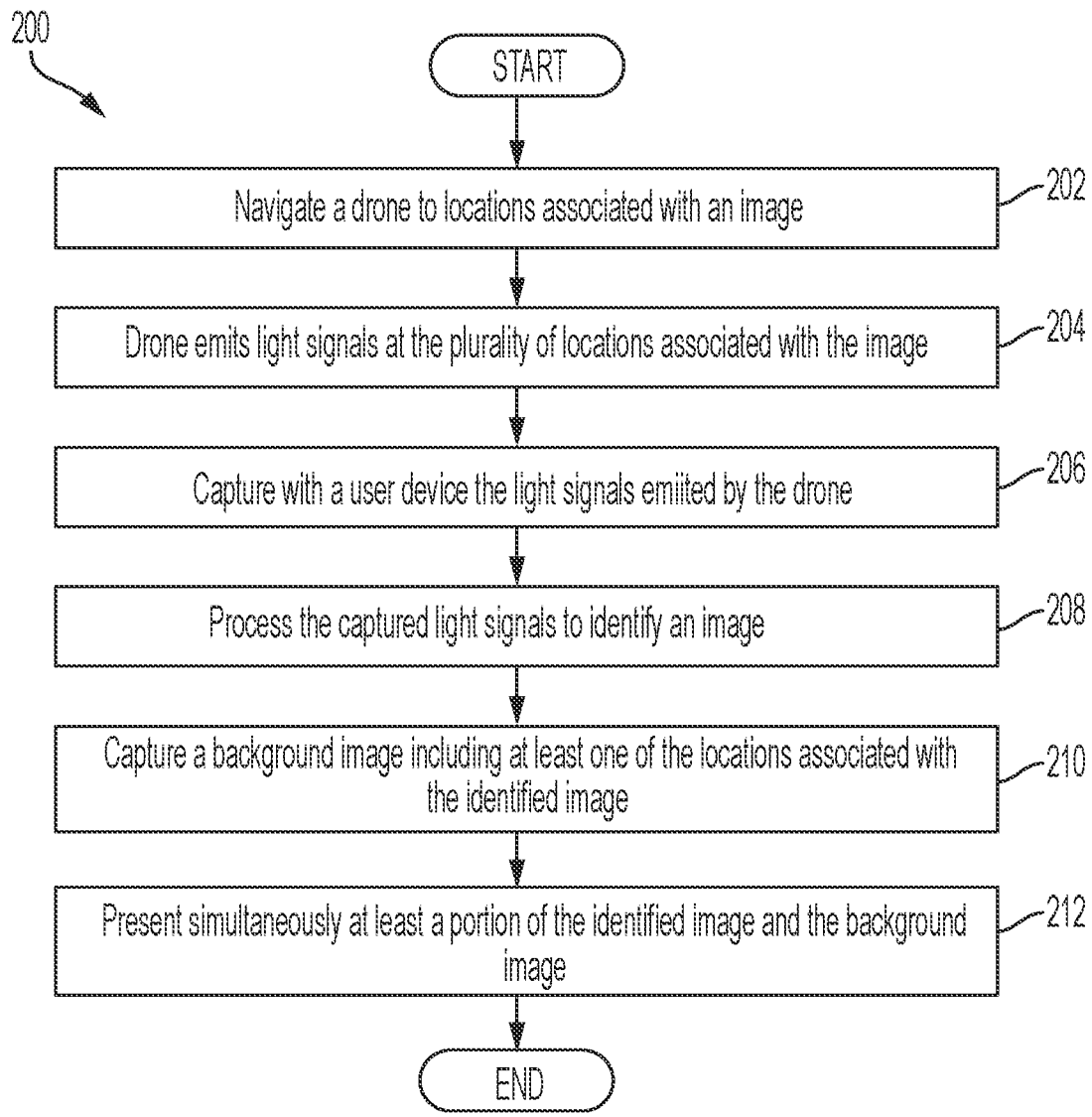
FIG. 2 is a flowchart illustrating an example method for presenting an image utilizing a single drone.

FIG. 2 is flow chart 200 illustrating an example method for presenting an image using a single drone and a user device. In one example, the system 100 of FIG. 1 implements the steps of the flow chart 200. One of skill in the art will understand other suitable components for implementing the method of flow chart 200 from the description herein.

At block 202, a drone is navigated to locations associated with an image. FIG. 3A depicts an example of locations 302 in space 300 that the drone 102 visits. In an example, using navigation unit 104, processor 108 navigates drone 102 to a plurality of locations 302 associated with the image. The processor 108 may retrieve location information (e.g., GPS coordinates) for the locations associated with the image from memory 110. The memory 110 may include multiple images and associated locations.

The locations associated with each image may be manually identified and may include relative and/or positional information that enables positioning and scaling of the image (e.g., by expanding/contracting the distance between locations) to fit a desired space and for orientation of the image at a desired angle. In an example, the locations are represented, for example, by Cartesian coordinates (e.g. (0, 1), (0, −3), (0, −5), (1, −3) etc.) in the space 300.

At block 204, the drone emits light signals at the locations associated with the image. In an example, the processor 108 of the drone 102 instructs the emitter 106 to emit the light signals at the locations 302. The processor 108 may retrieve the light signal information for the locations associated with the image from the memory 110. Some examples of the light signals include but are not limited to LED signals, infrared signals, radio frequency signals, etc.

In one example, the locations 302 (FIG. 3A) are pre-defined locations associated with (or used to create) a pre-determined path in the space. The pre-determined path is a flight path 310 (FIG. 3B) for the drone 102 that corresponds to the locations associated with the image that are stored in the memory 110. Some examples of pre-determined paths include but are not limited to relative directions (e.g., left, right, up, down), cardinal directions (e.g., north, south, east, west, northeast, northwest, southeast, southwest), angular directions (e.g., 90 degrees, 155 degrees, 180 degrees), etc.

FIG. 3B depicts an example of a pre-determined path 310 in space 300. The path 310 includes several different sections including a first section path 310a, a second section path 310b, a third section path 310c, a fourth section path 310d and a fifth section path 310e. The drone 102 may travel along the pre-determined path 310 and emit the light signals at the locations 302 along the pre-determined path 310.

In one example, the drone 102 travels along the path 310 in space. The drone 102 may travel the path 310 beginning from the first section path 310a, followed by the second section path 310b, followed by the third section 310c, followed by the fourth section 310d, and followed by the fifth section 310e. In one example, the drone 102 emits light signals at pre-defined locations 302 along the path 310 as it travels along the first, second, third, fourth and fifth sections 310a, 310b, 310c, 310d and 310e, respectively.

In one example, the light signals include different color signals (and/or patterns) such as green, yellow and red colors (and/or single and double flashes). A green color signal (and/or a single flash) at a location may indicate a beginning of a path, a yellow color signal (and/or a continuous light) between locations may indicate a middle of the path, and a red color signal (and/or a double flash) at a location may indicate an end of the path. For example, in the first path section 310a, the light signal may be a green color signal (and/or a single flash) at the coordinate (0, 1) and a red color signal (and/or a double flash) at the coordinate (0, −5). As the drone 102 travels the first path section 310a, it may flash the green light signal (or a single flash of any color) at the coordinate (0, 1) indicating a beginning of the first path section 310a and, optionally, continuously as the drone 102 follows the first path section 310a until it reaches the coordinate (0, −5) where it may flash the red light signal (or a double flash of any color) indicating an end of the first path section 310a. Similarly, the drone 102 may flash a green light signal (or a single flash of any color) at the coordinate (0, −3), which indicates a beginning of the second path section 310b and flash a red light signal (or a double flash of any color) at the coordinate (1,−3), which indicates an end of the second path section 310b. Similar light signals may indicate the third path section 310c, the fourth path section 310d, and the fifth path section 310e.

Referring back to FIG. 2, at block 206, a user device captures the light signals emitted by the drone. In an example, the user device 150 captures the light signals emitted by the drone 102 with the imager 156. The processor 108 may store the light signals including location information associated with their capture in the memory 154.

Figure 3C:
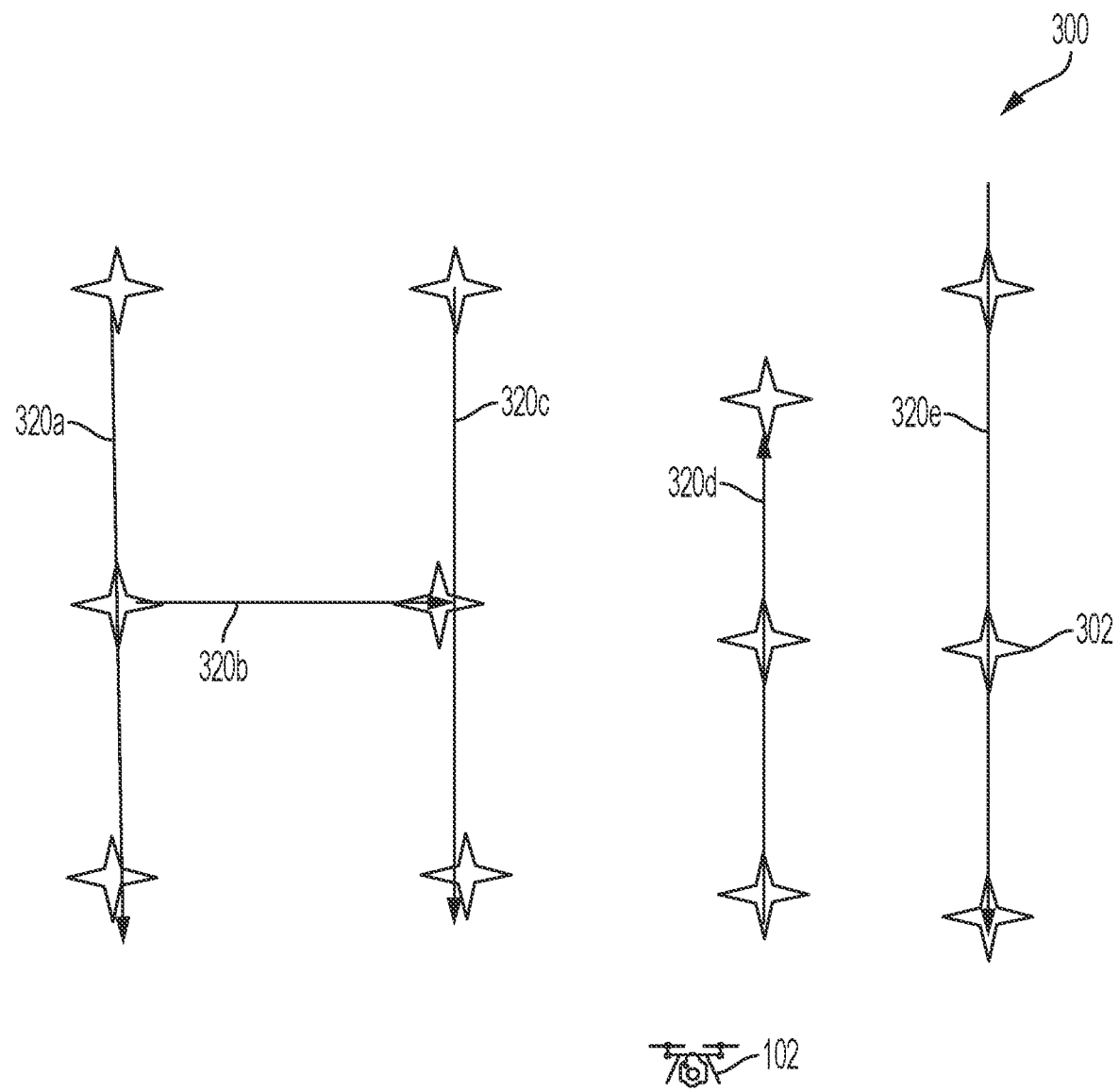
FIG. 3C is an example of line segments generated based on the emitted light signals of FIG. 3B.

At block 208, the captured light signals are processed to identify the image. In an example, the processor 152 of the user device 150 processes the light signals captured by the imager 156. The processor 152 may identify the image by generating and combining line segments from the captured light signals. The processor 152 functions to generate the line segments 320a-320e from the pre-defined locations 302 of the path 310 as illustrated in FIG. 3C.

Alternatively, the processor 152 may identify the image by generating and combining the line segments and comparing the combined line segments to stored images in order to identify a match. In one example, the images are stored in the memory 154. In one example, the stored images represent high definition version of the combined line segments 320*a*-320*e*. As such, the stored images present a clearer image than may be obtained from the line segments themselves (e.g., due to wind affecting the position of the drone when emitting light signals).

At block 210, a background image including at least one of the locations associated with the identified image is captured. In an example, user device 150 captures a background image with the imager 156. The imager 156 of the user device 150 may include at least one location within its field of view when capturing the background images. In one example, the imager 156 points to one or more of the pre-defined locations of FIG. 3C. The background image may include but is not limited to a sky, a wall, a roof of a structure, etc. Processor 152 may determine that the background image includes at least one of the locations of an image based on prior detection of the one or more light signals. Additionally, or alternatively, processor 152 may determine that the background image includes one of the locations of image based on based on GPS coordinates of the user devise and orientation information associated with the user device.

At block 212, the background image and at least a portion of the identified image that is within an area defined by the background image are presented simultaneously. In an example, the processor 152 of the user device 150 presents the background image, identifies a portion of the identified image that is within an area defined by the background image, and presents the identified portion of the image on the display 158 of the user device. In another example, the processor 152 of the system 100 may present the identified image and the background image onto a display of a peripheral device (e.g., a pair of virtual reality eyewear) via one of radio frequency signals, WiFi signals, light emitting device signals, infrared signals, etc.

Figure 4A:
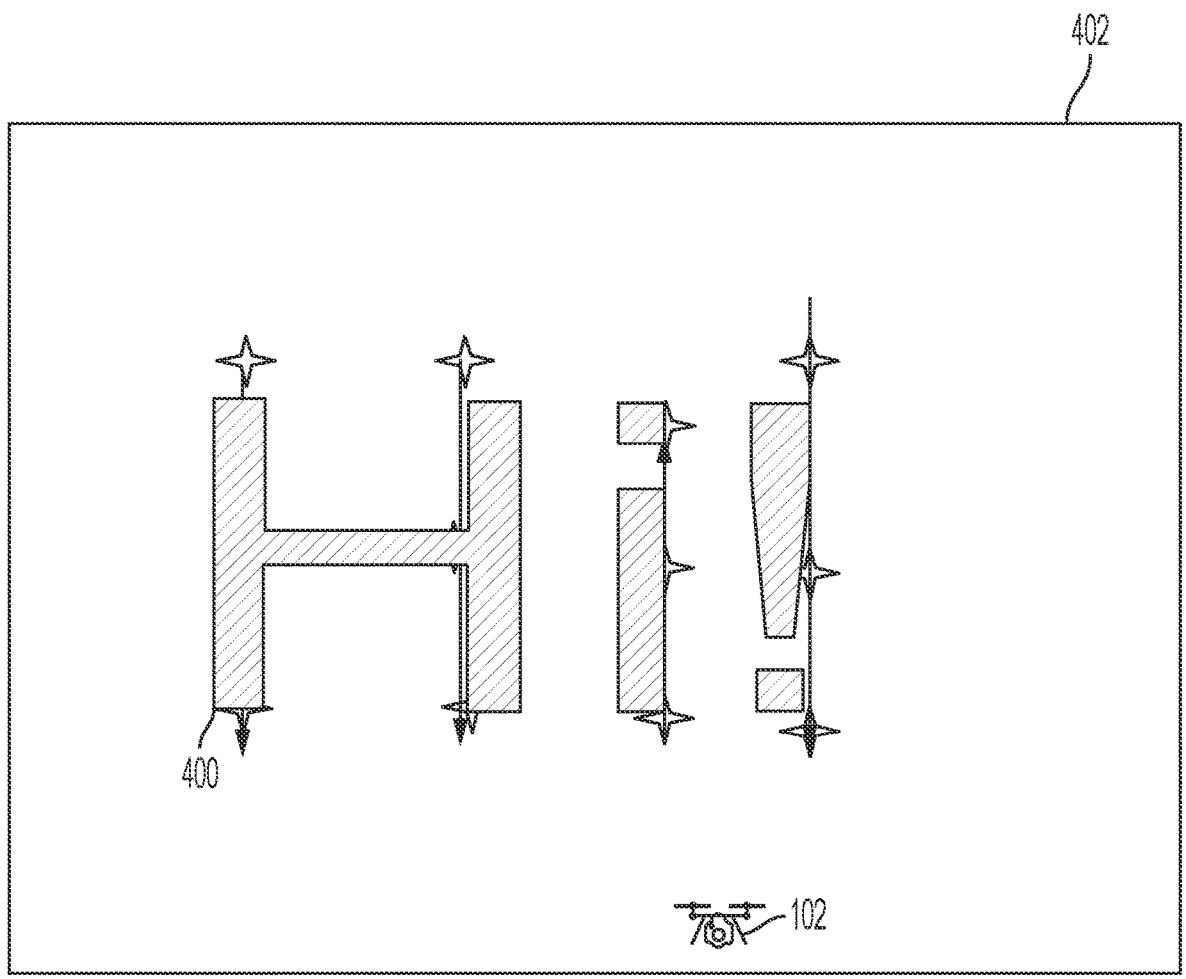
FIG. 4A is an example of an image identified to present on a user device corresponding to the line segments of FIG. 3C.

Each of the line segments 320*a*-320*e* may represent a simulated prolonged exposure of line segments between the flash signals 320 such that they appear to be a single image 400 on a background image 402 as shown in FIG. 4A. The image 400 along with the background image 402 is viewable through the display 158 on the user device 150.

In one example, an application (not shown) on the user device 150 may interpret each of the line segments 320*a*-320*e*. In the illustrated example, the line segments 320*a*, 320*b* and 320*c* are interpreted to be a letter "H", the line segment 320*d* is interpreted to be a letter "i", the line segment 320*e* is interpreted to be a punctuation mark "!". Accordingly, the image 400 displayed on the user device 150 is "Hi!" (or a portion thereof).

Figure 4B:
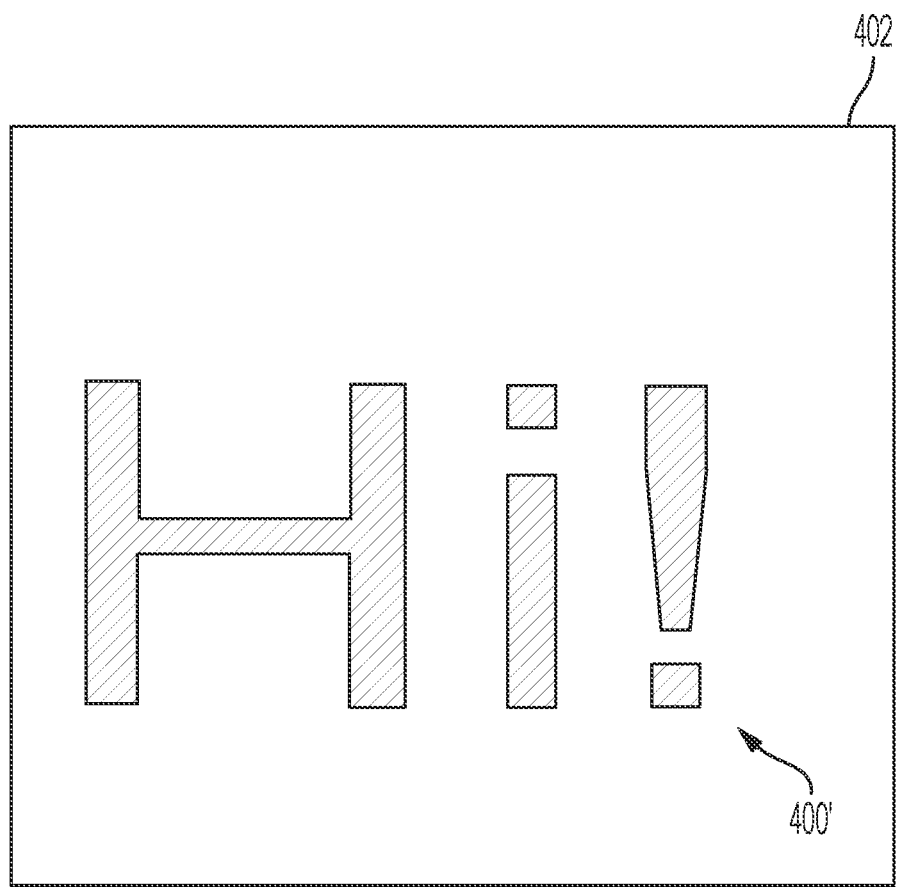
FIG. 4B is another example of an image identified to present on a user device corresponding to the line segments of FIG. 3C.

In another example, an application (not shown) replaces the line segments with a stored image (or portion thereof) that matches the line segments prior to presentation. FIG. 4B illustrates an example of an image 400' that matches the line segments on a background image 402. The image 400' represent a high definition version of the image 400.

In one example, the system 100 optimizes presentation of the image for viewing by the user device 150. The system 100 may alter the image to facilitate viewing by the user. For example, the system may modify the orientation of the image on the screen of the user device 150 in order to make it appear that the user is viewing the image from an optimum location rather than off to the side.

The processor 152 may account for different positions and/or movement of the user device 150 within the vicinity of the path 310 in order for accurate display of each one of the letters, i.e., "H" and "i," and the punctuation mark, i.e., "!" in the image 400 or 400' by the user device 150. For example, when the user device 150 is substantially perpendicular to a plane of the image 400 in the space 300, a user of the user device 150 can accurately view the letter "H" displayed onto the user device 150. However, when the user device 150 is positioned at significant angles away from perpendicular (e.g., 80 degrees) upon movement of the user device 150, the lines in the letter "H," for example, may incorrectly appear as bent or curved on the user device 150. The processor 152 may function to correct the appearance of the image by adjusting the image based on a distance and relative orientation between the drone 102 and the user device 150. The distance may be determined based on a position of the light signals with respect to the user device 150, a strength of the light signals relative the user device 150, time associated with the emitting of the light signals, or combinations thereof.

In one example, the light signals are RF signals and the processor 152 utilizes the RF signals to determine the position of the drone 102 in the space 300 with respect to the user device 150. In another example, the navigation unit 104 determines the location of the user device 150 via a navigation application (not shown) on the user device 150 in order to determine information related to the position of the drone 102 relative to the user device 150. The navigation unit 104 may communicate this position information to the processor 152, which then utilizes the position information to approximate the distance between the drone 102 and the user device 150. In another example, the processor 152 may determine the strength of the light signals (brightness/dullness) and utilize this information to approximate the distance between the drone 102 and the user device 150. In a further example, the time associated with emitting the light signals includes an amount of time it takes to emit light signals. The processor 152 may determine different sizes of the lines of letter "H". For example, the first path section 310*a* may look smaller than the second path section 310*b* in the image 400, yet it took same amount of time to create the first and the second path sections 310*a* and 310*b*, respectively. The processor 152 utilizes the size information to approximate the distance and/or orientation between the drone 102 and the user device 150.

In another example, the processor 152 utilizes a depth sensing application to correct for movement of the user device 150. The depth sensing application may determine depth based on one of the aforementioned methods. The processor 152 utilizes the depth information to accurately display the image 400 onto the user device 150. In one example, the processor 152 uses simultaneous localization and mapping (SLAM) to compensate for the differences in depth perceived by the user device 150 to create an accurate three-dimensional (3D) image. SLAM involves building a map of an unknown environment while at the same time navigating the environment using the map. Accordingly, regardless of the different locations or movement of the user device 150, the image 400 will be accurately displayed onto the user device 150 positioned within the vicinity of the drone.

Figure 5:
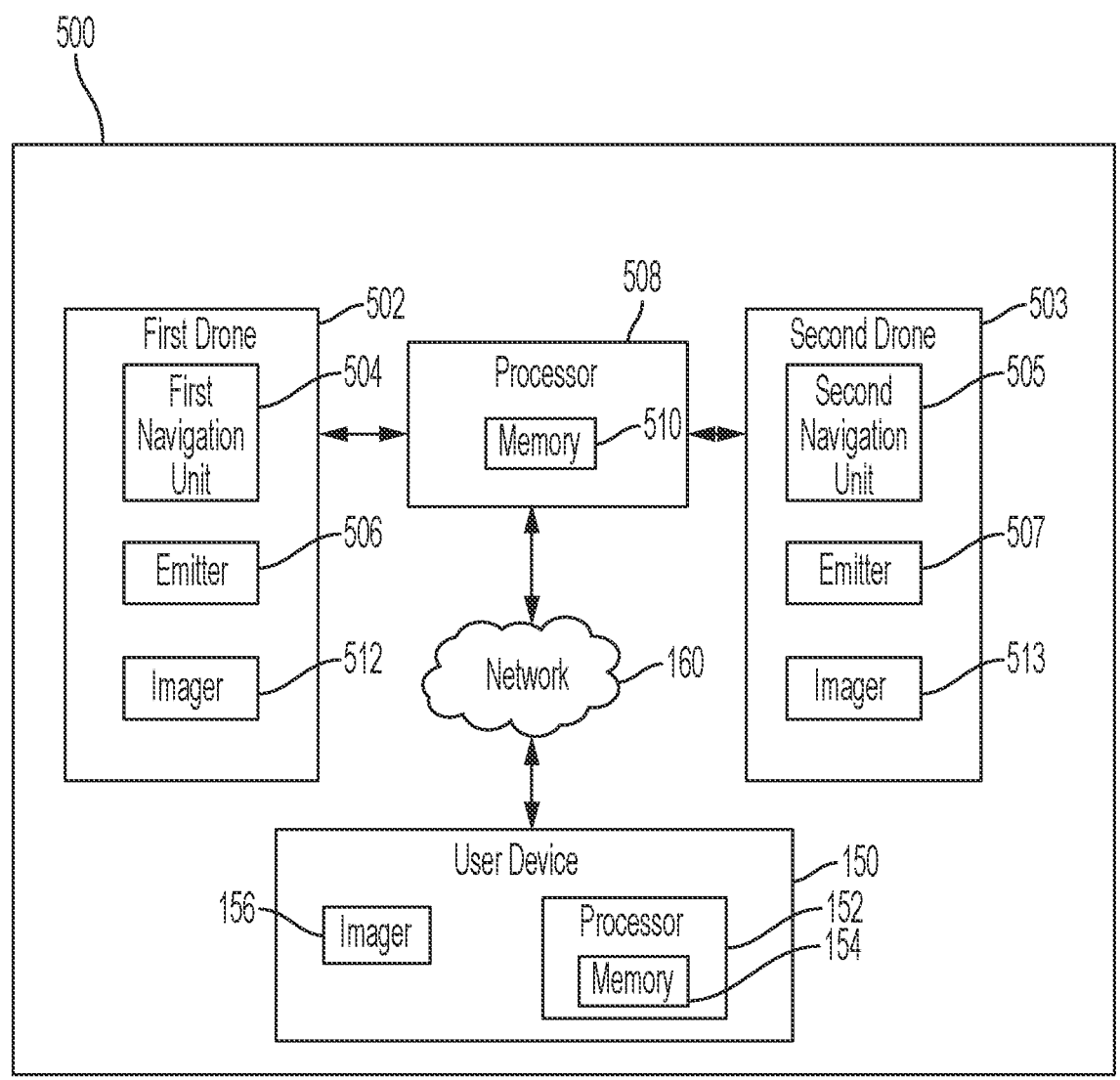
FIG. 5 is a block diagram of an example system for presenting an image utilizing two drones.

FIG. 5 is a block diagram of an example system 500 including two drones. Unlike the system 100 of FIG. 1, the system 500 of FIG. 5 includes two drones, i.e., a first drone 502 and a second drone 503. The first and the second drones 502 and 503 are each similar to the drone 102. In particular, the first drone 502 includes a first navigation unit 504 and the second drone 503 includes a second navigation unit 505, Each of the first and the second navigation units 504 and 505 are similar to the navigation unit 104 of FIG. 1. In addition, the first drone 502 includes a first emitter 506 and the second drone 503 includes a second emitter 507. Each of the emitters 506 and 507 are similar to the emitter 106 of FIG. 1. Further, the first drone 502 includes a first imager 512 and the second drone 503 includes a second imager 513. Each of the first and the second imagers 512 and 513 are similar to the imager 112 of FIG. 1. The system 500 also includes a processor 508 including a memory 510 coupled to the first and second drones 502 and 503, respectively. The processor 508 functions similar to the processor 108 of FIG. 1. Similarly, the memory 510 functions similar to the memory 110 of FIG. 1.

In one example, the processor 508 may be a processing system including a first processor in the first drone 502 and a second processor in a second drone 503 that communicate with one another (e.g., one as a master and one as a slave) to provide the functionality described herein. In another example, the processor 508 is a processing system that includes a first processor in the first drone 502, a second processor in a second drone 503, and a third processor that communicates with the first and second processor to provide the functionality described herein.

The system 500 also includes the user device 150 including the processor 152, memory 154, the imager 156 and the display 158 of FIG. 1. The processor communicates with the user device 150 via the network 160.

Figure 6:
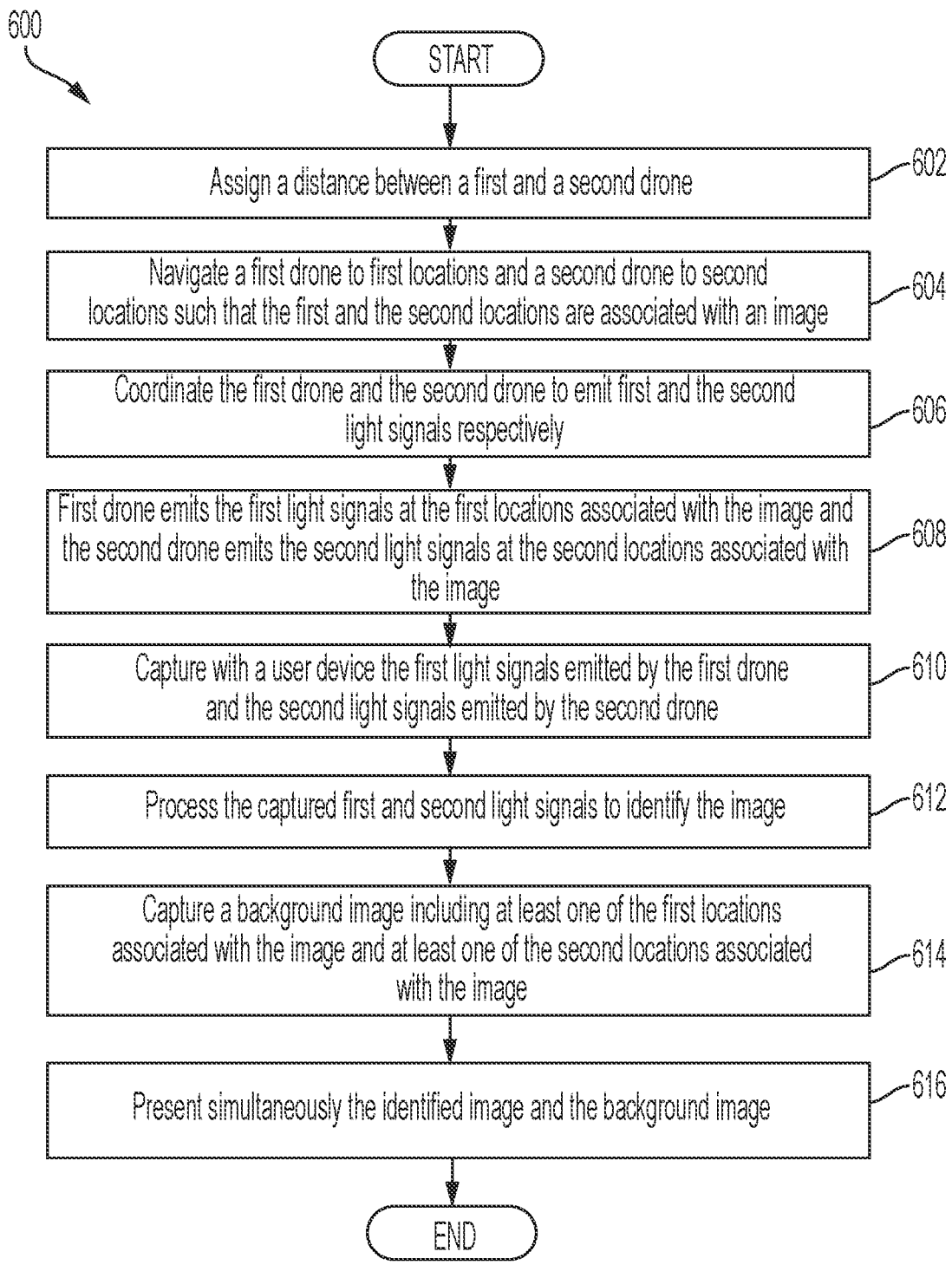
FIG. 6 is a flowchart illustrating an example method for presenting an image utilizing two drones.

FIG. 6 is flow chart 600 illustrating an example method for presenting an image using two drones and a user device. In one example, the system 500 of FIG. 5 implements the steps of the flow chart 600. One of skill in the art will understand other suitable components for implementing the method of flow chart 600 from the description herein.

At block 602, a distance between a first and a second drone is assigned. In one example, the first navigation unit 506 communicates current location of the first drone 502 with the processor 508 and the second navigation unit 507 communicates current location of the second drone 503 with the processor 508, which functions to instruct each of the first and the second drones 502 and 503, respectively, to maintain the assigned distance between each other. In another example, each of the first and the second drones 502 and 503 directly communicate their current locations with one another in order to maintain the assigned distance.

Figure 7A:
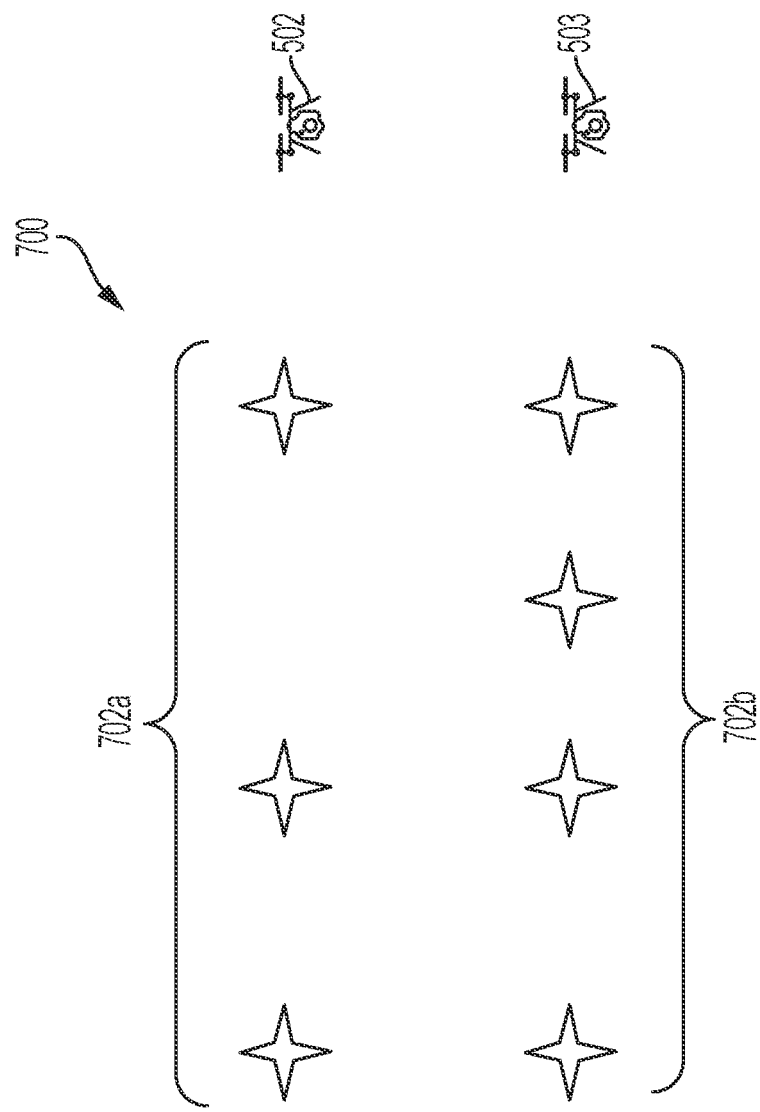
FIG. 7A is an example of light signals emitted in space by the two drones of FIG. 5.

At block 604, a first drone is navigated to first locations associated with an image and a second drone to second locations associated with an image. FIG. 7A depicts an example of first locations 702a in space 700 that the first drone 502 will visit and an example of second locations 702b in the space 700 that the second drone 503 will visit. In an example, using the first navigation unit 504, processor 508 navigates the first drone 502 to the first locations 702a associated with the image. Likewise, using the second navigation unit 505, the processor 508 and navigates the second drone 503 to second locations 702b associated with the image. Processor 508 may retrieve location information (e.g., GPS coordinates) for the locations associated with the image from memory 510. The memory 510 may include multiple images and associated locations. In one example, the first and the second locations associated with each image may be manually identified and may include relative and/or positional information that enables scaling of the image (e.g., by expanding/contracting the distance between locations) to fit a desired space and for orientation of the image at a desired angle.

At block 606, the first drone and the second drone are coordinated to emit first and the second light signals, respectively. The first and the second drones may be coordinated to emit light signals using time stamp information such that each of the first and the second drones emits the first and the second light signals at a desired time, e.g., at the same time or at different times.

At block 608, the first drone emits the first light signals at the first locations associated with the image and the second drone emits the second light signals at the second locations associated with the image. In an example, processor 508 emits the first light signals from the emitter 506 of the first drone 502 at the first locations 702a as illustrated in FIG. 7A. Likewise, processor 508 emits second light signals from the emitter 507 of the second drone 503 at the second locations 702b as illustrated in FIG. 7A. Processor 508 may retrieve light signal information for the first and the second locations associated with the image from memory 510. Some examples of the first and the second light signals include but are not limited to LED signals, infrared signals, radio frequency signals, etc.

In one example, the first and the second locations 702a and 702b (FIG. 7A) are pre-defined locations associated with (or used to create) one or more pre-determined paths in the space. The pre-determined path is a flight path for the first and the second drones 502 and 503 respectively that corresponds to the first and the second locations 702a and 702b respectively associated with the image that are stored in the memory 510. Some examples of pre-determined paths include but are not limited to relative directions (e.g., left, right, up, down), cardinal directions (e.g., north, south, east, west, northeast, northwest, southeast, southwest), angular directions (e.g., 90 degrees, 155 degrees, 180 degrees), etc.

Figure 7B:
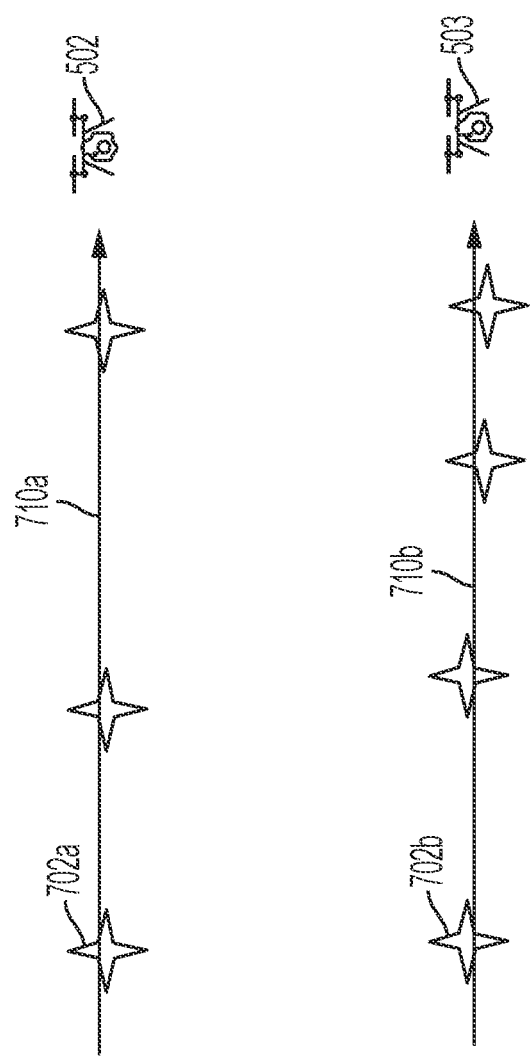
FIG. 7B is an example of the paths of the two drones and the emitted light signals of FIG. 7A.

FIG. 7B depicts an example of a first pre-determined path (first path) 710a and a second pre-determined path (second path) 710b in the space 700. The first drone 502 may travel along the first path 710a and emit the first light signals 702a at the first locations 702a along the first path 710a. The second drone 503 may travel along the second path 710b and emit the second light signals at the second locations 702b along the second path 710b. In one example, the first and the second light signals include color signals (and/or patterns) such as green, yellow, and red colors (and/or single/double flashes) similar to the light signals as discussed above with respect to FIGS. 3A and 3B.

Referring back to FIG. 6, at block 610, a user device captures the first light signals emitted by the first drone and the second light signals emitted by the second drone. In an example, the user device 150 captures the first and the second light signals with the imager 156. The processor 108 may store the light signals including location information associated with their capture in the memory 154.

At block 612, the captured first and the second light signals are processed to identify the image. The processor 152 of the user device 150 of the system 500 (FIG. 5) may process the first and the second light signals captured by the imager 156.

Figure 7C:
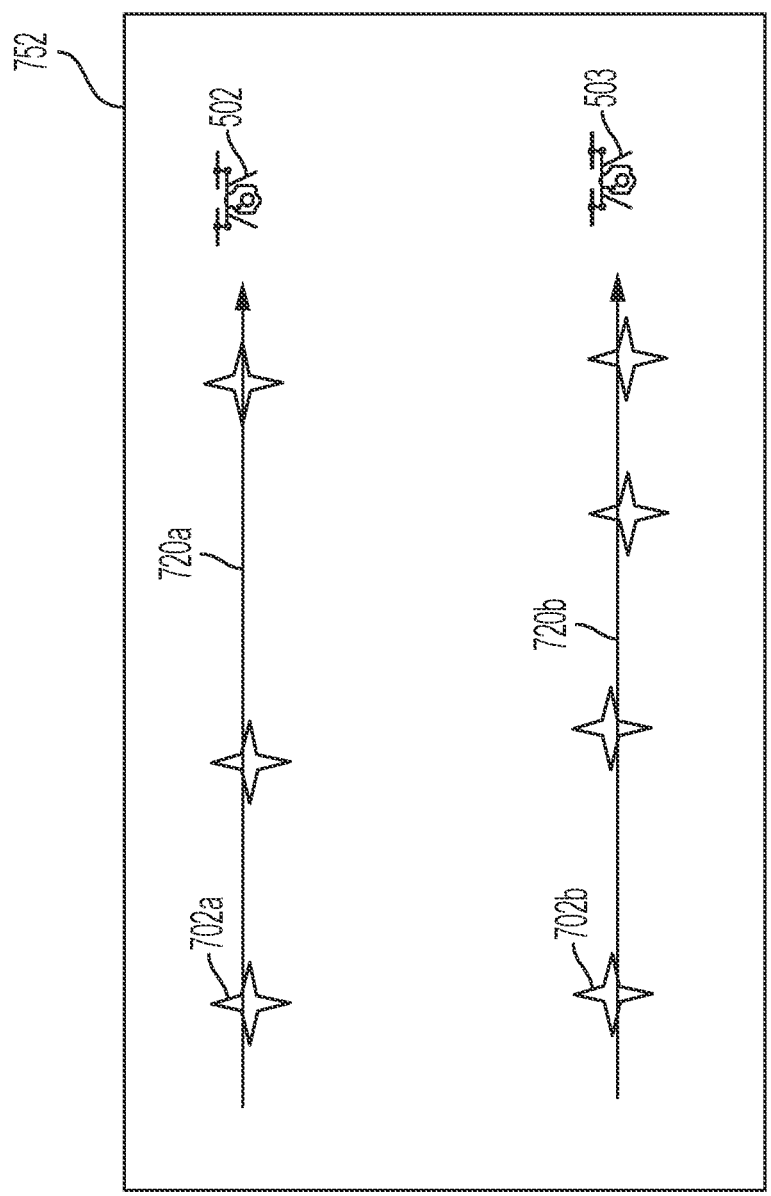
FIG. 7C is example of line segments generated based on emitted light signals of FIG. 7A.

In one example, the processor 152 of the system 500 generates a first line segment based on the first captured light signals and generates a second line segment based on the second captured light signals to generate a first line segment 720a and a second line segment 720b, respectively, as illustrated in FIG. 7C. As shown, the first line segment 720a connects the first light signals emitted at their corresponding pre-defined first locations 702a along the first path 710a. As such, the first line segment 720a corresponds to the pre-defined first locations 702a and orientation of the first path 710a in the space 700. Similarly, the second line segment 720b connects the second light signals emitted at their corresponding pre-defined second locations 702b along the second path 710b. As such, the second line segment 720b corresponds to the pre-defined locations 702b and orientation of the second path 710b in the space 700. In another example, the processor 152 of the system 500 generates a first line segment based on a first light signal within the first captured light signals and a second light signal within the second captured light signals.

Alternatively, the processor 152 may identify the image by generating and combining the line segments and comparing the combined line segments to stored images in order to identify a match. As such, the stored images present a clearer image than may be obtained from the line segments themselves (e.g., due to wind affecting the position of the drone when emitting light signals).

At block 614, a background image including at least one of the first locations associated with the image or the second locations associated with the image is captured. In an example, user device 150 of the system 500 captures a background image with imager 156. The imager 156 of the user device 150 may include at least one location within its field of view when capturing the background images. In one example, the imager 112 points to one or more of the pre-defined locations of FIG. 7C. The background image may include but is not limited to a sky, a wall, a roof of a structure, etc. Processor 152 may determine that the background image includes at least one of the locations of an image based on prior detection of the one or more light signals. Additionally, or alternatively, processor 152 may determine that the background image includes one of the locations of image based on based on GPS coordinates of the user devise and orientation information associated with the user device.

At block 616, the background image and at least a portion of the identified image that is within an area defined by the background image are simultaneously presented. In an example, the processor 152 of the user device 150 presents the background image, identifies a portion of the identified image that is within an area defined by the background image, and presents the identified portion of the image on the display 158 of the user device. In another example, the processor 152 of the system 100 may present the identified image and the background image onto a display of a peripheral device (e.g., a pair of virtual reality eyewear) via one of radio frequency signals, WiFi signals, light emitting device signals, infrared signals, etc.

Each of the first and the second line segments 720a and 720b represent a simulated prolonged exposure of line segments between the flash signals that appear to be a single image on a background image 752 as shown in FIG. 7A. The image with the line segments 720a and 720b along with the background image 752 are viewable through the display 158 on the user device 150. In one example, an application (not shown) on the user device 150 interprets each of the first and the second line segments 720a and 720b.

Aspects of the methods for skywriting to present an image, as outlined above, may be embodied in programming in general purpose computer hardware platforms 800 and 900 (such as described above with respect to FIGS. 8 and 9), e.g., in the form of software, firmware, or microcode executable by a networked computer system such as a server or gateway, and/or a programmable nodal device.

In one example, program aspects of the technology are "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may communicate through the Internet or various other telecommunication networks. Such communications, for example, may enable loading of the software, from one computer or processor (e.g., CPU 802 and CPU 902 of FIGS. 8 and 9 respectively) into another, for example, from a processor 108 of the system 100 and/or from a processor 508 of the system 500 to a computer or software of another system (not shown). Thus, another type of media that may bear the software elements includes optical, electrical, and electromagnetic waves, such as used across physical communication interface(s) 804 and 904 of FIGS. 8 and 9 respectively, between local devices, through wired and optical landline networks and over various air-links. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Figure 8:
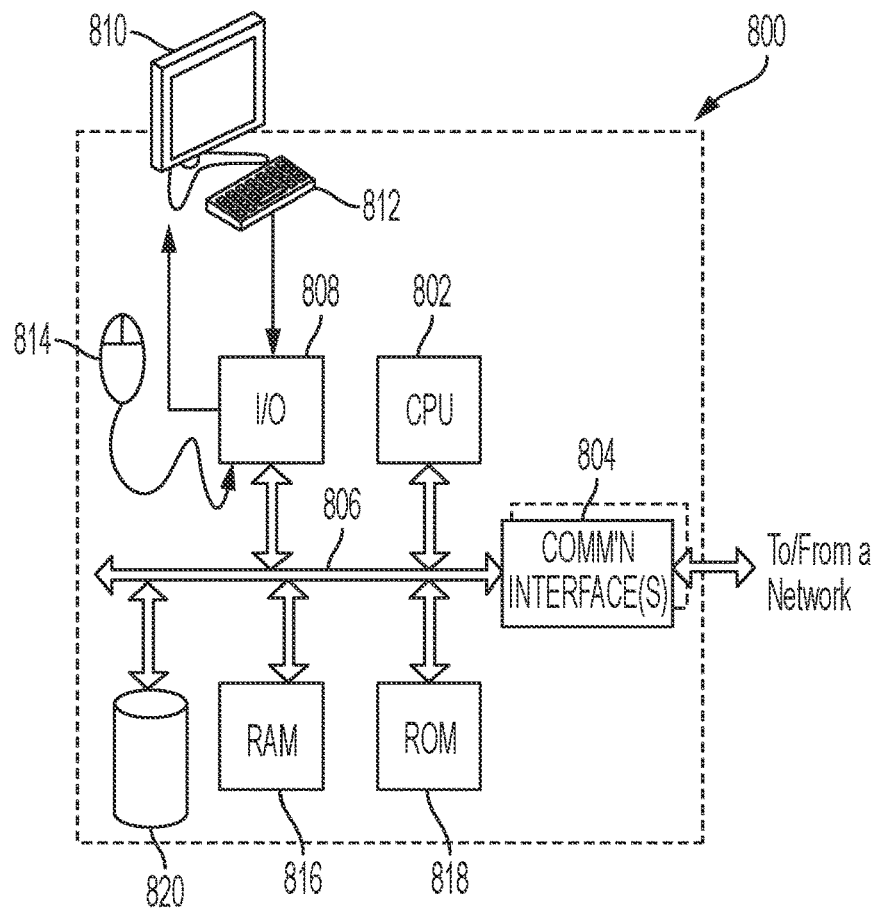
FIG. 8 is a functional block diagram illustrating a general-purpose computer hardware platform configured to implement the functional examples described with respect to FIGS. 1-7C.
Figure 9:
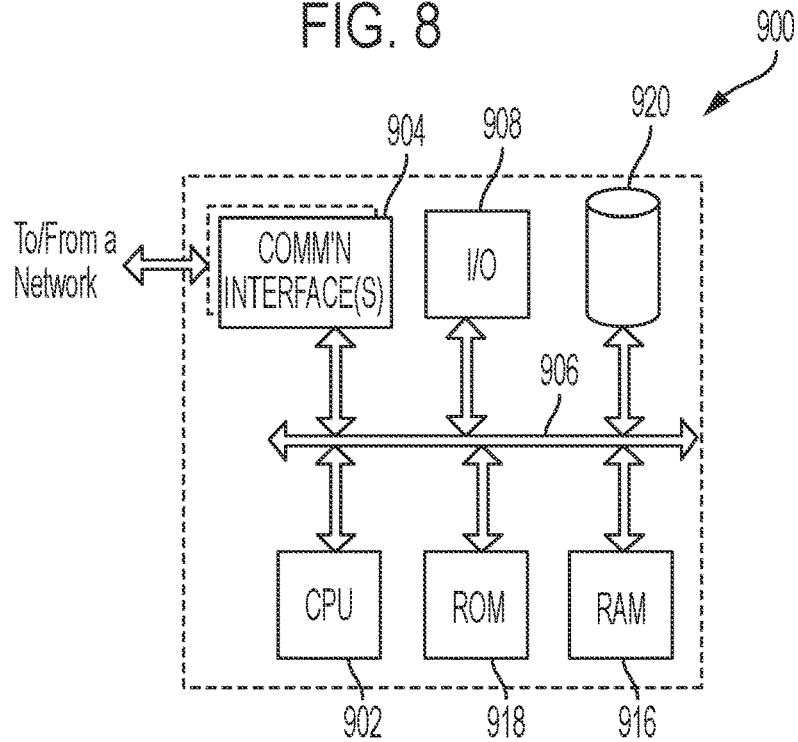
FIG. 9 is another functional block diagram illustrating a general-purpose computer hardware platform configured to implement the functional examples described with respect to FIGS. 1-7C.

Hence, a machine-readable medium may take many forms, including but not limited to, a tangible storage medium, a carrier wave medium or physical transmission medium. Non-transitory storage media include, for example, optical or magnetic disks, such as any of the storage devices in any computer(s) or the like. It may also include storage media such as dynamic memory, for example, the main memory of a machine or computer platform. Tangible transmission media include coaxial cables; copper wire and fiber optics, including the wires that include a bus (e.g., 806 and 906 of FIGS. 8 and 9 respectively) within a computer system that communicates to other components of the computer system via input/output (I/O) 808 and 908 of FIGS. 8 and 9, respectively. Carrier-wave transmission media can take the form of electric or electromagnetic signals, or acoustic or light waves such as those generated during radio frequency (RF) and light-based data communications. In one example, as shown in FIG. 8, the computer system includes a video display unit 810, (e.g., a liquid crystal display (LCD) or a cathode ray tube (CRT)), an alphanumeric input device 812 (e.g., a keyboard), a cursor control device 814 (e.g., a mouse), each of which communicate via the I/O 808.

Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, (e.g., 816 and 916 of FIGS. 8 and 9 respectively), a ROM (e.g., 818 and 918 of FIGS. 8 and 9 respectively), hard disk drive (e.g., 820 and 920 of FIGS. 8 and 9 respectively) a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Program instructions may include a software or firmware implementation encoded in any desired language. Programming instructions, when embodied in machine-readable medium accessible to a processor of a computer system or device, render computer system or device into a customized special-purpose machine to perform the operations specified in the program performed by processor 108 of the system 100 and/or processor 508 of the system 500.

While the foregoing has described are considered the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is ordinary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 105 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that includes the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

In addition, in the foregoing Detailed Description, it is seen that various features are grouped together in various examples to streamline the disclosure. This method of disclosure does not reflect an intention that the claimed examples require more features than are expressly recited in each claim. Rather, as the following claims reflect, the subject matter of the claims lies in less than all features of any single disclosed example. Thus, the following claims are hereby incorporated into the Detailed Description, with each claim standing on its own as a separately claimed subject matter.

While the foregoing describes what is considered to be the best mode and other examples, it is understood that various modifications may be made and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A drone comprising:
    a processor;
    a navigation unit configured by the processor to navigate the drone to a plurality of locations, the plurality of locations associated with a predetermined flight path in space corresponding to locations associated with an image; and
    an emitter configured by the processor to emit a plurality of light signals at the plurality of locations associated with the image as the drone follows the predetermined flight path to form the image in space, the light signals including a first light pattern or a first color at a start of a line segment of the image and a second light pattern or second color at the end of a line segment of the image as the drone follows the predetermined flight path to form the image.

2. The drone of claim 1, wherein the plurality of locations are pre-defined locations on the predetermined flight path in space.

3. The drone of claim 1, wherein each of the plurality of light signals is one of a flash, a color, or a combination thereof.

4. The drone of claim 1, wherein the image comprises the plurality of line segments forming at least one of a character, a number, a letter of an alphabet or combinations thereof.

5. The drone of claim 1, wherein location information for the plurality of locations associated with the image is stored in a memory.

6. A system comprising:
    the drone of claim 1; and
    a user device comprising:
        a display;
        an imager configured to capture the light signals emitted by the emitter of the drone and a background image including at least one of the plurality of locations associated with the image; and
        a user device processor configured to process the captured light signals to identify the image, determine a distance and relative orientation of the drone in space with respect to the user device, present simultaneously, on the display, at least a portion of the identified image and the background image, and adjust at least the portion of the identified image based on a distance and relative orientation between the drone and the user device.

7. The system of claim 6, wherein the light signals comprise radiofrequency signals and determining a distance and relative orientation of the drone in space with respect to the user device comprises utilizing the radiofrequency signals to determine a position of the drone in space with respect to the user device.

8. The system of claim 6, wherein the navigation unit determines a location of the user device via a navigation application on the user device and determining a distance and relative orientation of the drone in space with respect to the user device comprises determining a position of the drone relative to the determined location of the user device.

9. The system of claim 6, wherein the user device processor further configures the user device to determine a strength of the light signals emitted by the drone to approximate a distance between the drone and the user device.

10. The system of claim 6, wherein the user device processor further configures the user device to determine a time associated with emitting the light signals for respective path sections of the image to approximate at least one of a distance or orientation between the drone and the user device.

11. The system of claim 6, wherein the user device processor further configures the user device to execute a simultaneous location and mapping application to compensate for differences in depth of the light signals perceived by the user device to create the image as a three-dimensional image for presentation on the display device.

12. The system of claim 6, wherein the user device processor further configures the user device to:
generate a plurality of line segments based on the plurality of light signals, wherein each line segment among the plurality of line segments has a position and an orientation defined by the plurality of locations associated with the image; and
present the plurality of line segments as the identified image.

13. The system of claim 12, wherein the user device processor further configures the user device to:
compare each of the plurality of line segments with pre-determined line segments to identify a match; and
present the matched pre-determined line segments as the identified image.

14. The system of claim 6, further comprising:
a second drone having a second processor, a second navigation unit configured by the second processor to navigate the second drone to a plurality of second locations, the plurality of second locations associated with a second predetermined flight path in space corresponding to locations associated with the image, and a second emitter configured by the second processor to emit a plurality of second light signals at the plurality of second locations associated with the image as the second drone follows the second predetermined flight path to form the image in space, the second light signals including a third light pattern or a third color at a start of a line segment of the image and a fourth light pattern or fourth color at the end of a line segment of the image as the second drone follows the second predetermined flight path to form the image;
wherein the imager of the user device captures the second light signals emitted by the second emitter of the second drone; and
the user device processor processes the captured light signals emitted by the drone and the captured second light signals by the second drone to identify the image.

15. A non-transitory computer readable medium having stored thereon a program, wherein execution of the program of the non-transitory computer readable medium configures a user device to:
capture, with an imager of the user device, a plurality of light signals emitted by at least one drone at a plurality of locations as the at least one drone follows a predetermined flight path to form line segments of an image in space, the light signals including a first light pattern or a first color at a start of a line segment of the image and a second light pattern or second color at the end of a line segment of the image as the at least one drone follows the predetermined flight path to form the image;
process the captured plurality of light signals to identify the image;
determine a distance and relative orientation of the drone in space with respect to the user device;
capture, with the imager of the user device, a background image including at least one of the plurality of locations associated with the image;
present simultaneously, on a display of the user device, at least a portion of the identified image and the background image; and
adjust at least the portion of the identified image based on a distance and relative orientation between the drone and the user device.

16. The non-transitory computer readable medium of claim 15, wherein the light signals comprise radiofrequency signals and determining a distance and relative orientation of the drone in space with respect to the user device comprises utilizing the radiofrequency signals to determine a position of the drone in space with respect to the user device.

17. The non-transitory computer readable medium of claim 15, wherein the drone comprises a navigation unit that determines a location of the user device via a navigation application on the user device and determining a distance and relative orientation of the drone in space with respect to the user device comprises determining a position of the drone relative to the determined location of the user device.

18. The non-transitory computer readable medium of claim 15, wherein the non-transitory computer readable medium includes instructions that when executed configures the user device to determine a strength of the light signals emitted by the drone to approximate a distance between the drone and the user device.

19. The non-transitory computer readable medium of claim 15, wherein the non-transitory computer readable medium includes instructions that when executed configures the user device to determine a time associated with emitting the light signals for respective path sections of the image to approximate at least one of a distance or orientation between the drone and the user device.

20. The non-transitory computer readable medium of claim 15, wherein the non-transitory computer readable medium includes instructions that when executed configures the user device to execute a simultaneous location and mapping application to compensate for differences in depth of the light signals perceived by the user device to create the image as a three-dimensional image for presentation on the display device.

\* \* \* \* \*